United States Patent

[11] 3,585,294

[72] Inventor David O. Lewis
Waukegan, Ill.

[21] Appl. No. 727,913
[22] Filed May 9, 1968
[45] Patented June 15, 1971
[73] Assignee Warwick Electronics Inc.

[54] RF AND IF AUTOMATIC GAIN CONTROL CIRCUITRY WITH EXTENDED RANGE IF CONTROL
8 Claims, 2 Drawing Figs.

[52] U.S. Cl. ........ 178/7.3, 325/405, 325/410
[51] Int. Cl. ........ H04n 5/52
[50] Field of Search ........ 178/5.8, 7.3 DC, 7.5 DC; 325/404, 414, 405, 410

[56] References Cited

UNITED STATES PATENTS

| | | | |
|---|---|---|---|
| 3,036,211 | 5/1962 | Broadhead et al. | 325/410 |
| 3,306.976 | 2/1967 | Massman et al. | 178/7.3 (DC) |
| 3,344,355 | 9/1967 | Massman | 325/405 |
| 3,450,834 | 6/1969 | De Marinis et al. | 178/7.3 (DC) |

*Primary Examiner*—Robert L. Griffin
*Assistant Examiner*—Richard P. Lange
*Attorney*—Hofgren, Wegner, Allen, Stellman & McCord

ABSTRACT: In a signal receiver, an automatic gain control circuit for applying gain control signals to an RF stage and an IF stage which is operative at received signal levels above a predetermined level to connect the RF gain control circuit to the IF stage so that a composite gain control signal is applied to the if stage to extend the range of control therefor.

Figures 1, 2:
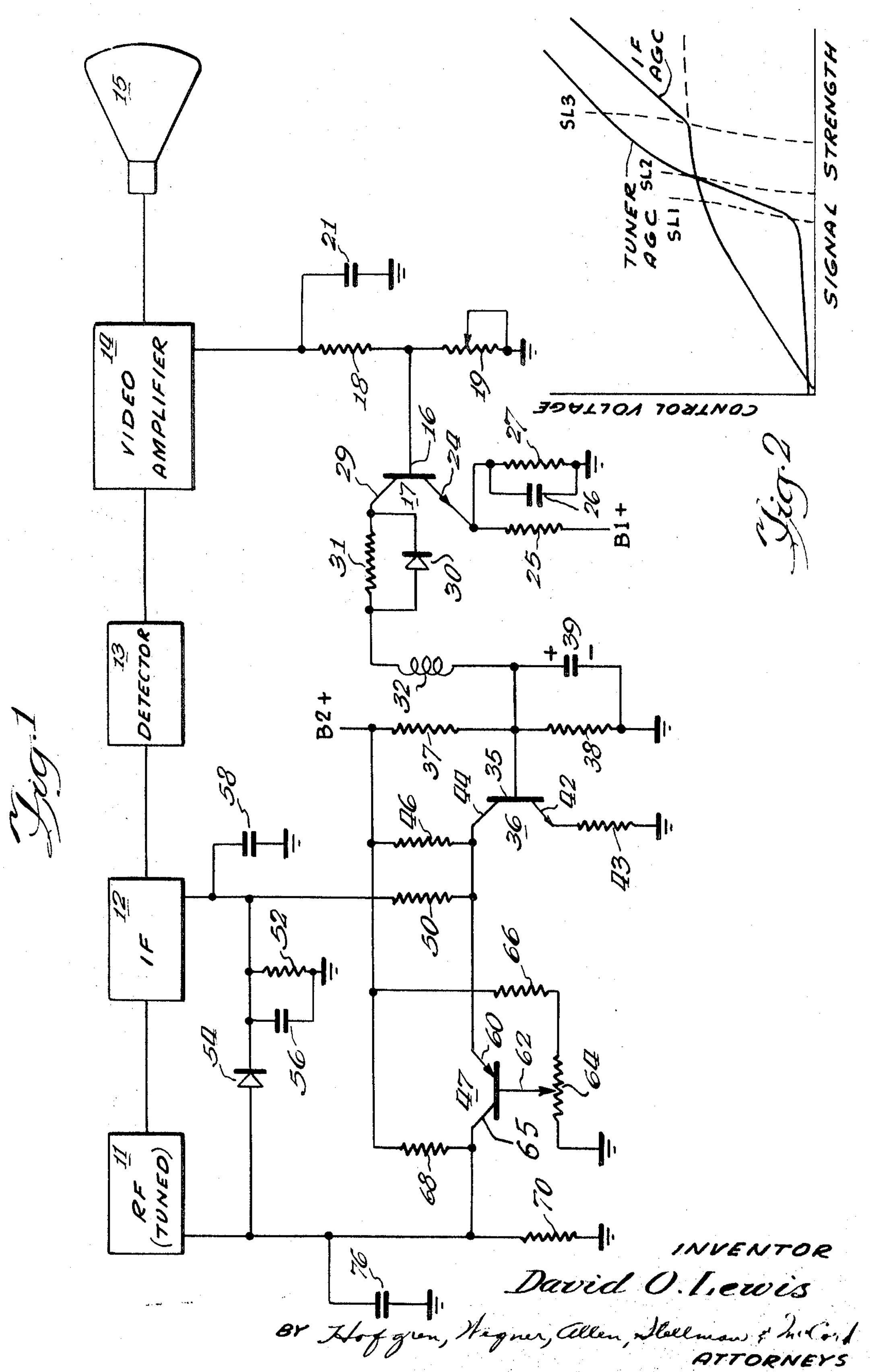

INVENTOR
David O. Lewis
BY Hofgren, Wegner, Allen, Stellman & McCord
ATTORNEYS

RF AND IF AUTOMATIC GAIN CONTROL CIRCUITRY WITH EXTENDED RANGE IF CONTROL

This invention concerns an improved automatic gain control circuit which is particularly useful in radio or television receivers.

It is common to use an automatic gain control (AGC) circuit in television receivers to minimize the effect of changes in received signal strength. A typical television receiver has an RF (radio frequency) stage, and IF (intermediate frequency) stage, a detector stage and a video amplifier stage. The AGC circuit is interposed between the video amplifier stage and the RF and IF stages and regulates the gain or bias of the RF and IF stages such that a strong received signal is amplified thereby less than a weak received signal. As a result, the amplitude of the signal at the output of the video amplifier is maintained relatively constant. The provision of the AGC in the receiver eliminates the effect of periodic amplitude variations which would otherwise cause fading. Additionally, the contrast and volume controls need not be reset continually as signal strength varies.

A commonly used television receiver AGC circuit consists of an AGC keyer, an AGC amplifier, and an AGC delay amplifier. The keyer is rendered operative to produce an output, dependent upon the peak amplitude of horizontal sync pulses in a composite video signal received by the television receiver, when the horizontal sync pulses occur concurrently with flyback pulses developed in the horizontal output transformer. The keyer output is amplified by the AGC amplifier, integrated and applied as a gain control signal to the IF stage. The AGC delay amplifier becomes effective when the received signal exceeds a predetermined level, i.e., when the signal at the output of the AGC amplifier exceeds a predetermined level, to provide a variable gain control signal for the RF amplifier. The RF gain control signal is maintained at a low level until the received signal is strong enough to develop a substantial IF gain control signal. As the delay amplifier becomes effective, the RF gain control signal increases in amplitude more rapidly than the IF gain control signal and eventually becomes greater than IF gain control signal. When the received signal is at high levels, the RF stage is heavily biased to reduce the gain of the RF stage so that the output thereof will not overload the IF stage. However, at such high signal levels, the IF stage is not biased as heavily to reduce the gain and prevent overloading. Accordingly, at high signal levels, overloading of the IF stage may occur which results in distortion of the signal. It follows that such AGC circuits provide inadequate control for large received signals.

In accordance with the present invention, an improved AGC circuit is provided which applies conventional gain control signals to the RF and IF stages until the received signal attains a predetermined level and connects the RF gain control circuit to the IF stage at signal levels above the predetermined level so that a composite gain control signal is applied to the IF stage. The composite control of the IF stage extends the range of control thereof which prevents overloading and signal distortion.

An object of this invention is to provide an automatic gain control circuit for a signal receiver which connects the gain control signal circuit for the RF stage to the IF stage at received signal levels above a predetermined level.

A further object is to provide an automatic gain control circuit for a signal receiver including means for applying a supplementary gain control signal to the IF amplifier at received signal levels above a predetermined level.

Another object is to provide an automatic gain control circuit for a signal receiver which develops two gain control signals, one which is applied to the IF stage and the other which is applied to the RF stage and is used to supplement the control signal for the IF stage at signal levels above a predetermined signal level.

Still a further object is to provide gain control signals for the RF and IF stages of a signal receiver, wherein one signal is dependent upon the other at signal levels above a predetermined level.

Further features and advantages will be readily apparent from the following specification and from the drawings, in which:

FIG. 1 is a block diagram of circuitry of a television receiver illustrating the environment of the invention with a schematic diagram of the automatic gain control circuit embodying the present invention; and FIG. 2 is a graph of control voltage as a function of signal strength illustrating the variations in control voltages applied to the RF and IF stages of the receiver shown in FIG. 1 as the received signal varies in strength.

The invention as illustrated herein is embodied in an automatic gain control circuit for a television receiver where the problem of overloading in the IF stage is particularly troublesome. It will be understood, however, that this invention can be used in any desired signal receiver, wherein automatic gain control is desired.

Referring now to FIG. 1, circuitry of a television receiver is illustrated which includes an automatic gain control circuit constructed in accordance with the teachings of the present invention. The exemplary circuit has an RF or tuner stage 11 which selects, amplifies, and converts a composite video and sound modulated carrier signal to an intermediate frequency. The intermediate frequency signal is applied to and amplified by an IF stage 12. The output of the IF stage 12 is coupled to a detector circuit 13 where the sound and video portions of the signal are separated and the video portion is supplied to a video amplifier stage 14. The amplified video signal is coupled through appropriate circuitry to a picture tube 15. In order to maintain a substantially constant output from the video amplifier 14 in the face of variations in the received signal, an AGC circuit is provided which is connected between the video amplifier stage 14 and the RF and IF stages 11,12 and which controls the gain of the RF and IF stages 11,12 in accordance with the video signal level.

In accordance with the present invention, the AGC circuit is designed to provide a greater range of control than present conventional AGC circuits. At lower and intermediate signal levels, the AGC circuit of the present invention functions as present conventional circuits to provide variable IF gain control at low signal levels and to provide variable IF and RF gain control at intermediate signal levels. At higher signal levels, the AGC circuit functions to connect the RF gain control portion to the IF gain control portion so that gain control of the IF stage is supplemented by the RF gain control and parallels that for the RF stage.

The video signal at the video amplifier 14, which contains a voltage pedestal upon which a horizontal sync pulse is superimposed, is applied across a voltage divider consisting of a resistor 18 and a potentiometer 19 so that a control voltage is developed across the potentiometer 19 which is representative of the received signal level. The control voltage is applied to the base 16 of an AGC keying amplifier 17, shown in the form of an NPN transistor. The potentiometer 19 allows for adjustment of the bias on amplifier 17 and thus the AGC bias level. In order to bypass to ground radiofrequency signals and high frequency variations contained in the video signal, a capacitor 21 may be connected in parallel with the voltage divider 18,19. The emitter 24 of the AGC keying amplifier 17 is connected to the junction of a pair of series connected resistors 25,27 in a voltage dividing bias network consisting of the resistors 25,27 and a positive voltage supply B1+ so that the emitter is normally biased positive with respect to the base and the amplifier is cut off. A capacitor 26 is connected in parallel with resistor 27 to bypass the emitter 24 to ground for RF signals. The collector 29 is connected through the parallel arrangement of a diode 30 and a resistor 31 to one side of a flyback winding 32 of a horizontal output transformer 37,38, (not shown). The other side of the flyback winding 32 is connected to the junction of a pair of series connected resistors 37,38 in a voltage dividing bias network associated with an AGC amplifier 36 which consists of the resistors 37,38, a positive voltage supply B2+ and a capacitor 39 connected in parallel with resistor 38. The capacitor 39 normally builds up a charge as shown. When a flyback pulse is developed in winding 32 concurrent with the application of the horizontal sync pulse having sufficient amplitude to the voltage divider 18,19, the amplifier 17 is rendered conductive to bleed off a portion of the charge on capacitor 39. The level of conduction of amplifier 17 and thus the amount of bleed off are determined by the voltage developed across potentiometer 19 which in turn is determined by the horizontal sync pulse amplitude. As the received signal varies in strength, the amplitude of the horizontal sync pulse varies so that conduction of the amplifier 17 is dependent upon received signal strength.

The voltage developed across the parallel arrangement of resistor 38 and capacitor 39 is applied to the base 35 of the AGC amplifier 36, which is shown in the form of an NPN transistor, and the parallel arrangement 38,39 provides integration and filtering action responsive to cyclical conduction of the amplifier 17. The base 35 is positively biased by this arrangement and, since the emitter 42 is connected to ground through a resistor 43 and since the collector 44 is connected to the voltage supply B2+ through a load resistor 46, the AGC amplifier 36 is normally biased into conduction. The level of conduction of amplifier 36 is dependent upon the base voltage which, in turn, is dependent upon the level of conduction of amplifier 17 during flyback and thus is dependent upon the received signal strength. A gain control signal for the IF stage 12 is derived from a voltage dividing network consisting of series resistors 46, 50, 52 and the voltage supply B2+ which is associated with the collector of amplifier 36. More specifically, the IF gain control signal is derived across resistor 52 which is shunted by a filter capacitor 56. The voltage drop across load resistor 46, i.e. the voltage at collector 44, is dependent upon conduction of amplifier 36. Accordingly, it is apparent that the voltage developed across resistor 52, and thus the IF gain control signal, is dependent upon the received signal strength. Moreover, it is apparent that as the received signal increases in amplitude, amplifier 36 becomes less conductive, responsive to increased conduction of amplifier 17, causing the voltage at its collector to increase which in turn causes the voltage developed across resistor 52 to increase so that the IF gain control signal increases to reduce the gain of the IF stage 12.

The collector 44 of the AGC amplifier 36 is also connected to the emitter 60 of an AGC delay amplifier 47, shown in the form of a PNP transistor. The base 62 of amplifier 47 is connected to the adjustable tap on a potentiometer 64 which together with a serially connected resistor 66 and the positive voltage supply B2+ form a voltage divider network. At low signal levels when amplifier 36 is in its higher conduction range, the base is biased positive with respect to the emitter and the amplifier 47 is cut off. The collector 65 of amplifier 47 is connected to the junction of resistors 68,70 which together with the positive voltage supply B2+ form a voltage divider network. The collector 65, and thus the junction of resistors 68,70, is also connected to the RF stage 11 so that a gain control signal for the RF stage is developed across the resistor 70. At low signal levels when the delay amplifier 47 is cut off, the RF gain control signal has a low value determined by the values of resistors 68,70 and the voltage supply B2+, i.e. a substantially constant RF gain control signal is developed.

When the received signal attains a level whereat the voltage at the collector of amplifier 36, and thus at the emitter of amplifier 47, exceeds the positive bias on the base of amplifier 47 determined by the setting of potentiometer 64, amplifier 47 is rendered conductive and the voltage developed across resistor 70, i.e. the RF gain control signal, becomes dependent upon the level of conduction of the amplifier 47. As the received signal increases, the amplifier 47 increases its conduction causing the RF gain control signal to increase correspondingly. In essence, the amplifier 47 functions as a variable impedance and causes the RF gain control signal to increase at a greater rate than the IF gain control signal increases as the received signal level increases further. It will be apparent that the potentiometer 64 allows for presetting the signal level at which the amplifier 47 becomes effective to increase the RF gain control signal.

In order to provide RF bypass to ground, both for the associated stage and for the associated gain control circuit, a capacitor 76 is associated with the gain control input for the RF stage 11 and a capacitor 58 is associated with the gain control input for the IF stage 12.

The AGC circuit as described to this point functions as a conventional AGC circuit. In accordance with the present invention, means are provided for increasing the IF gain control signal at a rate corresponding the rate of increase of the RF gain control signal at signal levels above a predetermined level. More specifically, means are provided for applying the RF gain control signal to the IF stage 12 to supplement the IF gain control signal when the RF gain control signal exceeds the IF gain control signal by a prescribed amount. In the exemplary arrangement, a diode 54 is connected between the gain control signal developing resistors 70 and 52 respectively for the RF stage 11 and the IF stage 12. When the voltage developed across the resistor 70 exceeds the voltage developed across the resistor 52 by the breakdown voltage of the diode 54, the diode conducts so that current flows from the RF gain control circuit through the diode and through the resistor 52 to increase the IF gain control signal in accordance with the amount of current flowing through the diode. As the received signal increases beyond the level at which the diode breaks down, the voltage developed across the resistor 52 will follow the voltage developed across the resistor 70 and will lag therebehind an amount substantially equal to the threshold voltage of diode 54. Accordingly, at signal levels above the diode breakdown, the IF gain control signal will follow or track the RF gain control signal.

The operation of the exemplary AGC circuit will now be described in conjunction with the graph of FIG. 2. When the received signal has a strength below the level designated SL1, amplifiers 17,36 function to produce an IF gain control signal dependent upon the signal strength whereas amplifier 47 is cut off and a substantially constant RF gain control signal is produced by the associated voltage divider network (resistors 68,70 and voltage supply B2+). The amplifier 17 is rendered conductive responsive to the simultaneous occurrence of the horizontal sync pulse in the base circuit and the flyback pulse in the horizontal output transformer winding 32 in the collector circuit if the voltage developed across potentiometer 19 exceeds the emitter bias voltage developed across resistor 27. When amplifier 17 conducts, it bleeds off charge from the capacitor 39 in accordance with the conduction level thereof which depends on the horizontal sync pulse amplitude. The capacitor 39 and the resistor 38 provide an integration and filtering action and the voltage developed thereacross determines the conduction of amplifier 36. The voltage at the collector of amplifier 36 is dependent upon the conduction thereof and determines the IF gain control signal developed across resistor 52. As the received signal increases in strength, amplifier 17 conducts more heavily bleeding off more of the charge on capacitor 39 and causing the base bias for amplifier 36 to be reduced so that amplifier 36 conducts less. Responsive thereto the voltage at the collector of amplifier 36 rises causing the IF gain control signal to increase in amplitude so that the gain of the IF stage is reduced correspondingly. As the received signal decreases in strength, the operation reverses causing the IF stage gain to increase.

When the received signal strength reaches the level designated SL1, the voltage at the collector of amplifier 36 is sufficient to overcome the base bias of amplifier 47 so that amplifier 47 begins to conduct and the RF gain control signal developed across resistor 70 becomes dependent thereon. As the received signal increases beyond this level, amplifier 47 conducts more heavily causing the RF gain control signal to increase correspondingly. At the same time, the IF gain control signal increases. Because of the circuit characteristics, the RF gain control signal changes with changes in the signal strength at a greater rate than the IF gain control signal changes. Moreover, at signal levels above that designated SL2, the RF gain control signal exceeds the IF gain control signal and the difference therebetween increases with increases in the received signal. As may be seen, the IF gain control signal tends to level off once the RF gain control signal begins to increase.

The operation to this point corresponds to that for present conventional AGC circuits. However, in the circuit of the present invention, the diode 54 breaks down at the signal strength level designated SL3, since the difference between the voltages developed across gain control resistors 52,70 exceeds the diode threshold voltage, so that at signal strengths above this level current flows from the RF gain control circuit through the diode and through resistor 52 causing the IF gain control signal to follow or track the RF gain control signal. At such signal levels, the difference in amplitude between the gain control signals will correspond to the breakdown voltage for the diode 54. Moreover, at such signal levels, the gains of the RF and IF stages are reduced to compensate for the increased signal strength.

It will be apparent that the AGC circuit of the present invention prevents IF stage overloading because of the extended range of gain control therefor. Thus, overloading and signal distortion in subsequent stages is prevented, and a substantially constant video output is produced by the video amplifier stage in the face of changes in the received signal strength. The AGC circuit of this invention has no detrimental effects on the receiver operation.

While certain embodiments of the invention have been shown and described, it is to be understood that the invention is capable of many modifications. Changes, therefore, in the construction and arrangement may be made without departing from the spirit and scope of the invention as disclosed in the appended claims.

I claim:

1. In a a wave signal receiver for signals of varying strength having an RF stage with variable gain and an IF stage with variable gain, an automatic gain control circuit comprising:

first circuit means responsive to the received signal strength for developing a first automatic gain control signal;

means for coupling said first automatic gain control signal to one of said variable gain stages;

second circuit means for developing a second automatic gain control signal having a substantially constant magnitude for received signal strengths less than a first prescribed level and having a magnitude proportional to said received signal strength for received signal strengths equal to or greater than said first prescribed level;

means for coupling said second gain control signal to the other of said variable gain stages; and third circuit means operative at a second prescribed received signal level greater than said first prescribed level, for coupling said second automatic gain control signal to said one variable gain stage to supplement said first automatic gain control signal applied to said one variable gain stage.

2. The automatic gain control circuit of claim 1 wherein said one variable gain stage comprises said IF stage and said other variable gain stage comprises said RF stage.

3. The apparatus of claim 2 wherein:

said first circuit means includes an amplifier for producing said first automatic gain control signal in proportion to said received signal strength; and said second circuit means includes an amplifier responsive to said received signal attaining a first prescribed level to produce said second automatic gain control signal in proportion to said received signal strength.

4. The automatic gain control circuit of claim 2 wherein the gain control signals applied to the RF and IF stages are DC voltages.

5. The automatic gain control circuit of claim 3 wherein said second automatic gain control signal increases responsive to increased signal strength at a greater rate than said first automatic gain control signal so that above a predetermined received signal level, less than said second prescribed received signal level, said second automatic gain control signal exceeds said first automatic gain control signal by increasing amounts, and wherein said third circuit means responds to said second automatic gain control signal exceeding said first automatic gain control signal by a prescribed amount to supplement said first automatic gain control signal with said second automatic gain control signal.

6. The automatic gain control circuit of claim 5 wherein said third circuit means includes a diode having a predetermined breakdown voltage.

7. In a radio wave receiver for signals of varying strength having an RF stage with variable gain and an IF stage with variable gain, an automatic gain control circuit comprising: first means for developing a signal representative of the received signal strength; a first load connected to the IF stage and across which an IF gain control signal is developed; a second load connected to the RF stage and across which an RF gain control signal is developed; second means responsive to the representative signal for developing a gain control signal across the first load which is dependent upon received signal strength; third means associated with the second means and responsive to the IF gain control signal exceeding a prescribed level for developing a gain control signal across the second load which is dependent upon received signal strength; and means connected between the loads for causing the RF gain control signal to develop a supplementary control signal across the first load when the control signal developed across the second load exceeds the control signal developed across the first load by a predetermined amount.

8. The automatic gain control circuit of claim 7 wherein the loads are resistors across which DC voltages are developed and the connecting means is in the form of a diode which allows current to flow from the second load through the first load when the difference in voltages developed across the loads exceeds the diode breakdown voltage.